United States Patent
Wu et al.

(10) Patent No.: US 6,837,469 B2
(45) Date of Patent: Jan. 4, 2005

(54) STRUCTURE OF LIQUID CRYSTAL DISPLAY (LCD)

(76) Inventors: Wei Chung Wu, PO Box 82-144, Taipei (TW); Hwang Ping Lin, PO Box 82-144, Taipei (TW)

(*) Notice: Subject to any disclaimer, the term of this patent is extended or adjusted under 35 U.S.C. 154(b) by 0 days.

(21) Appl. No.: 10/426,857

(22) Filed: May 1, 2003

(65) Prior Publication Data

US 2004/0217244 A1 Nov. 4, 2004

(51) Int. Cl.$^7$ ............................................. F16M 11/00
(52) U.S. Cl. .............................. 248/278.1; 248/346.06; 248/371; 248/923
(58) Field of Search ................................. 248/919, 921, 248/922, 923, 278.1, 317, 346.06, 371, 397, 474, 133, 917; 361/682; 403/116, 117, 112, 113; 16/340

(56) References Cited

U.S. PATENT DOCUMENTS

| | | | | |
|---|---|---|---|---|
| 6,168,124 B1 | * | 1/2001 | Matsuoka et al. | 248/176.1 |
| 6,268,997 B1 | * | 7/2001 | Hong | 361/681 |
| 6,378,830 B1 | * | 4/2002 | Lu | 248/278.1 |
| 6,601,810 B2 | * | 8/2003 | Lee | 248/278.1 |
| 2002/0083554 A1 | * | 7/2002 | Lu | 16/340 |
| 2003/0121124 A1 | * | 7/2003 | Chen | 16/339 |
| 2003/0122046 A1 | * | 7/2003 | Huong | 248/291.1 |
| 2003/0132360 A1 | * | 7/2003 | Ju | 248/371 |

* cited by examiner

Primary Examiner—Ramon O. Ramirez
Assistant Examiner—Ingrid Weinhold
(74) Attorney, Agent, or Firm—Leong C. Lei

(57) ABSTRACT

A liquid crystal display (LCD) structure which includes a display; an adjustment device having a securing rod with two ends mounted with a hinge chain module; a seat body including an engaging slot and a positioning slot; a support rod including a positioning rib, thereby one side of the display is connected to the chain module of the adjustment device, with the securing rod being connected to one end of the support rod, the support rod corresponding to the other end of the adjustment device is connected to the engaging slot, the positioning rib is extended to the positioning slot of the seat body so that the LCD can be adjusted The hinge chain module includes a securing seat mounted with positioning holes for the positioning shaft, the ends of the positioning holes are extended outwardly to form a fan-like shape, the securing seat is disposed with a securing plate which can be mounted on the display, the two lateral sides of the securing seat are mounted with two damping pads and the external side of the damping pads is provided with an elastic pad and at least one pressing pad mounted by way of a screw nut to the end of the positioning shaft.

4 Claims, 6 Drawing Sheets

STRUCTURE OF LIQUID CRYSTAL DISPLAY (LCD)

BACKGROUND OF THE INVENTION (a) Technical Field of the Invention

The present invention relates to an Liquid Crystal Display (LCD), and in particular, to an LCD support which allows an LCD to be adjusted and a bottom seat for adjusting the elevational angle of an LCD. The present invention is a bottom seat of an LCD which has a simple structure and lowers the cost of production.

(b) Description of the Prior Art

An LCD without an adjustable height structure may not be suitable for users who are particularly short or tall in height. One way of overcoming this problem of a fixed height LCD is by adjusting the height of the table or desk supporting the display. It is very common for the desk or the table to have many articles or objects on it, such as the host computer, printer, etc. As a result, adjusting the height of the table can be time consuming. Even if the height of the table is adjusted, the user may still have to be seated in an uncomfortable position in order to operate the computer for a prolonged period. Accordingly, it is an object of the present invention to overcome the above drawback by providing an improved structure of an LCD.

Taiwanese patent publication nos. 375316, 390451 disclose the structure of a conventional LCD. The LCD is provided with a retractable platform device or a hydraulic cylinder to adjust the height of the LCD. However, one common drawback of these two LCDs is that the structure is complicated and therefore, it is very laborious. to install. This will cause an increase in the cost of production. Additionally, the adjusting the height of the LCD is not convenient. The weight of the LCD has been increased which not only takes up more space but also causes greater inconvenience in its transportation.

Therefore, it is an object of the present invention to provide an improved structure of a LCD, which mitigates the drawbacks disclosed above.

SUMMARY OF THE INVENTION

Accordingly, it is an object of the present invention to provide a Liquid Crystal Display (LCD) structure comprising a display; an adjustment device having a securing rod with two ends mounted with a hinge chain module; a seat body including an engaging slot and a positioning slot; a support rod including a positioning rib, thereby one side of the display is connected to the chain module of the adjustment device the securing rod being connected to one end of the support rod, a second end of the support rod is connected to the engaging slot, the positioning rib is extended to the positioning slot of the seat body so that the LCD can be adjusted.

Yet another object of the present invention is to provide a Liquid Crystal Display (LCD), wherein the securing rod is mounted onto the support rod and the two ends of the securing rod are provided with a positioning shaft, and the hinge chain module includes a securing seat mounted with positioning holes for the positioning shaft, the ends of the positioning holes are extended outward to form a fan-like shape, the securing seat is disposed with a securing plate which can be mounted on the display, the two lateral sides of the securing seat are mounted with two damping pads and the external side of the damping pads is provided with an elastic pad and at least a pressing pad mounted by way of a screw nut to the end of the positioning shaft Still another object of the present invention is to provide a Liquid Crystal Display (LCD), wherein the display includes a recess at the rear side thereof and the recess is provided with a plurality of screw holes for the mounting of the adjustment device onto the securing seat with screws, and the recess is covered with a rear cover, and the bottom section of the rear cover is provided with a plurality of notches for the support rod, and for the passages of connection wires or power source wires of the display.

Yet a further object of the present invention is to provide a Liquid Crystal Display (LCD), wherein the protruded pillar of the engaging slot of the seat body is provided with a through hole to the bottom section of the seat body, and the bottom section of the seat body is mounted with a screw nut, and the support rod is provided with a passing hole to the bottom section, the passing hole is for the mounting of a pivot shaft screw with a pad onto the screw nut of the seat body.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way off illustrative example.

DETAILED DESCRIPTION OF THE PREFERRED EMBODIMENT

Figure 1:
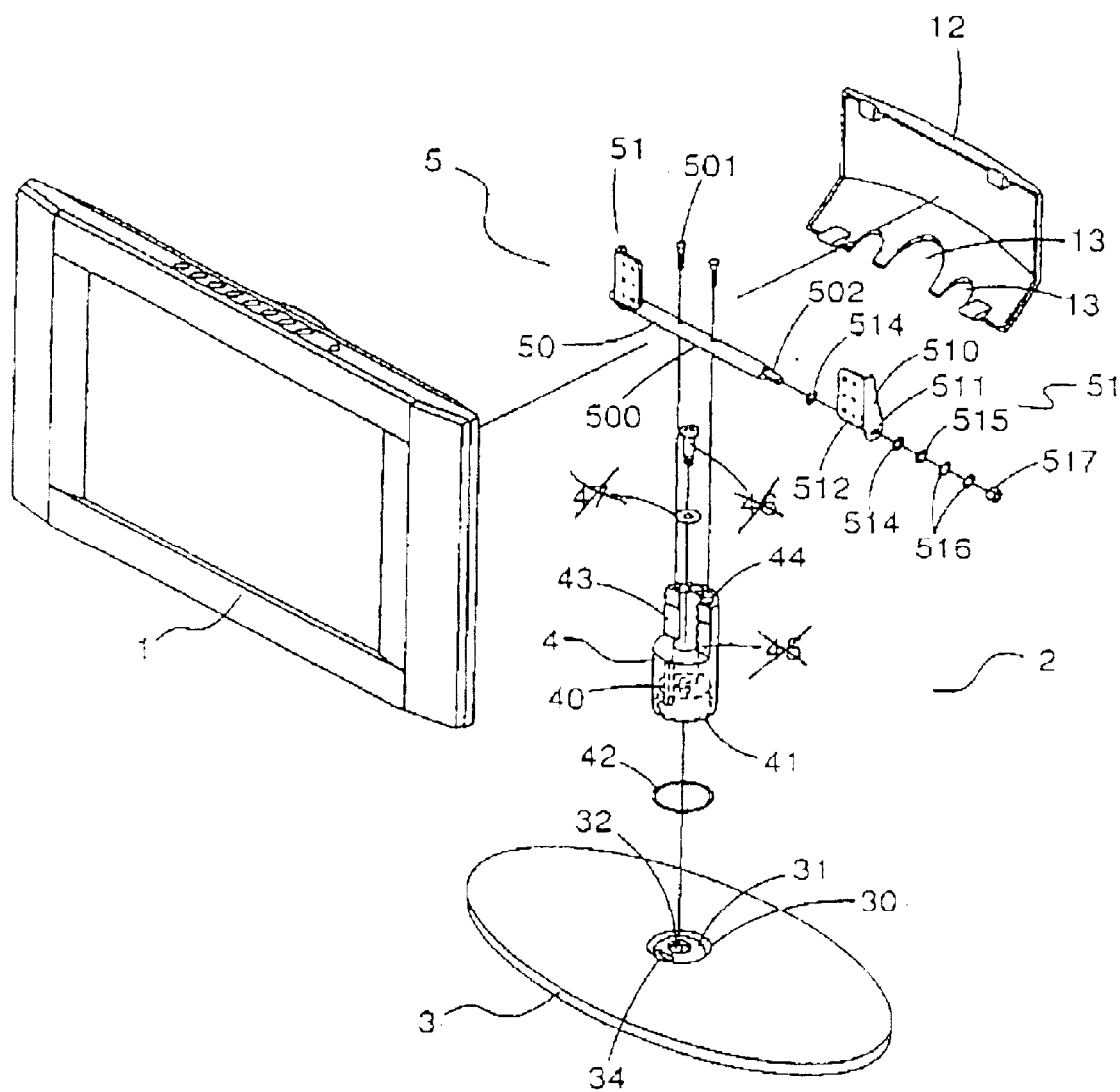
FIG. 1 is a perspective exploded view of the LCD structure of the present invention.
Figure 2:
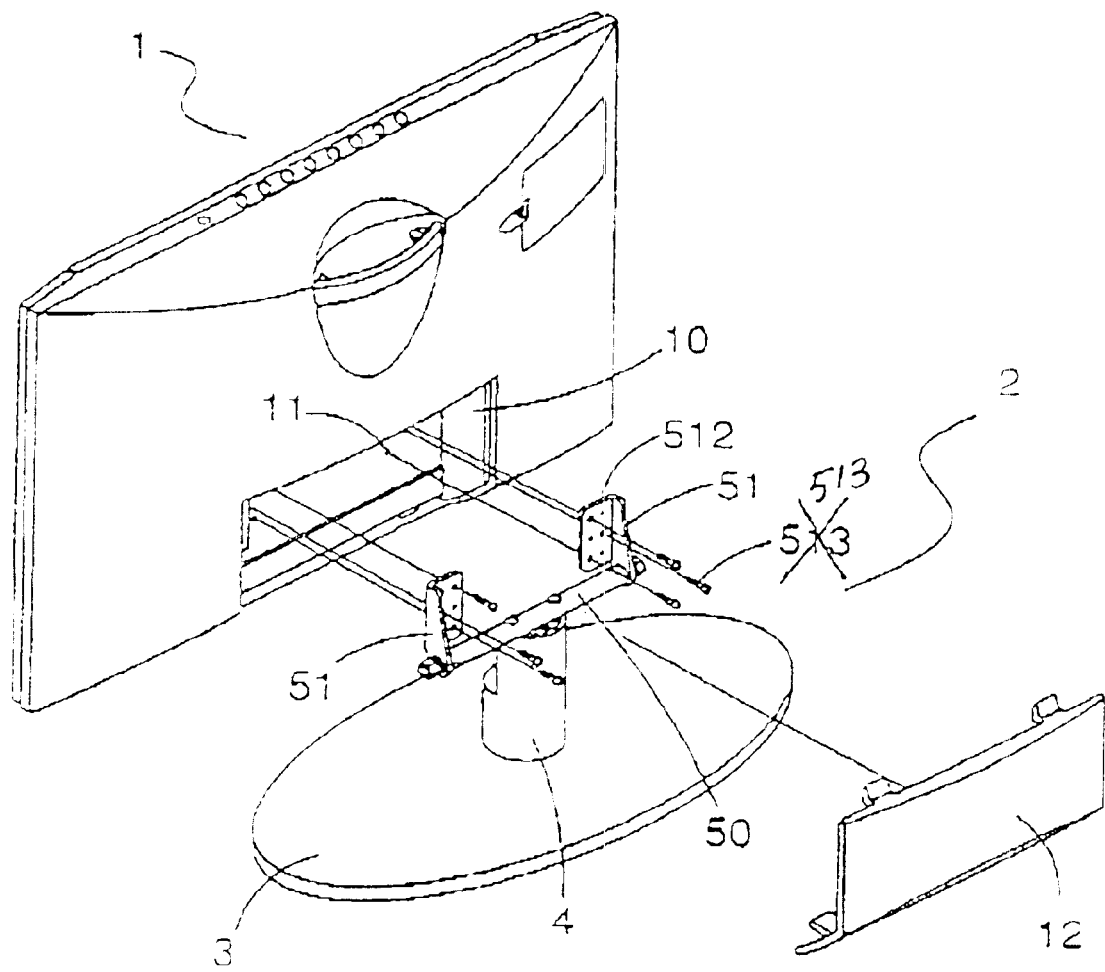
FIG. 2 is a perspective view of the LCD together with the adjustment device of the present invention.
Figure 3:
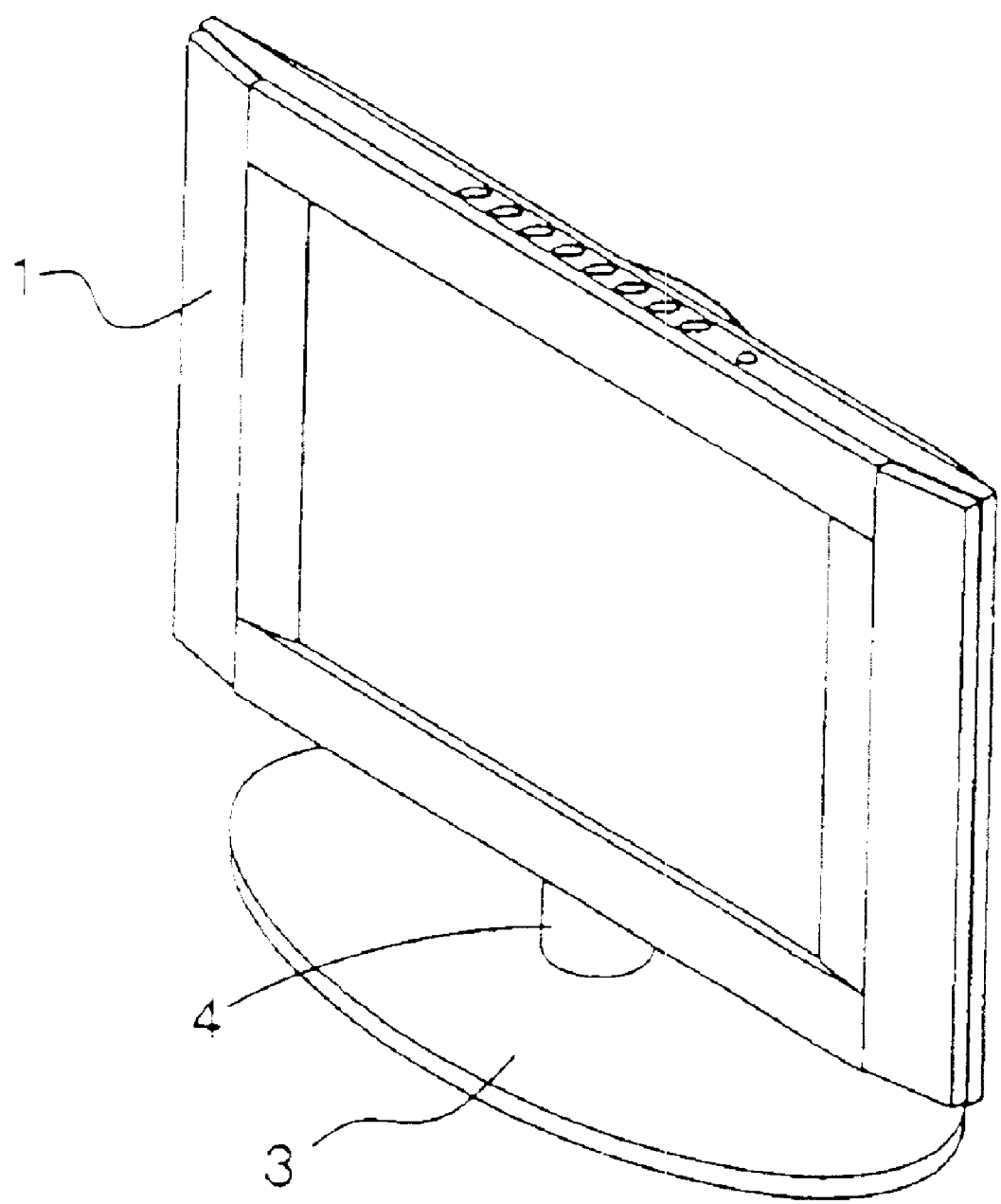
FIG. 3 is a perspective view of the present invention.
Figure 4:
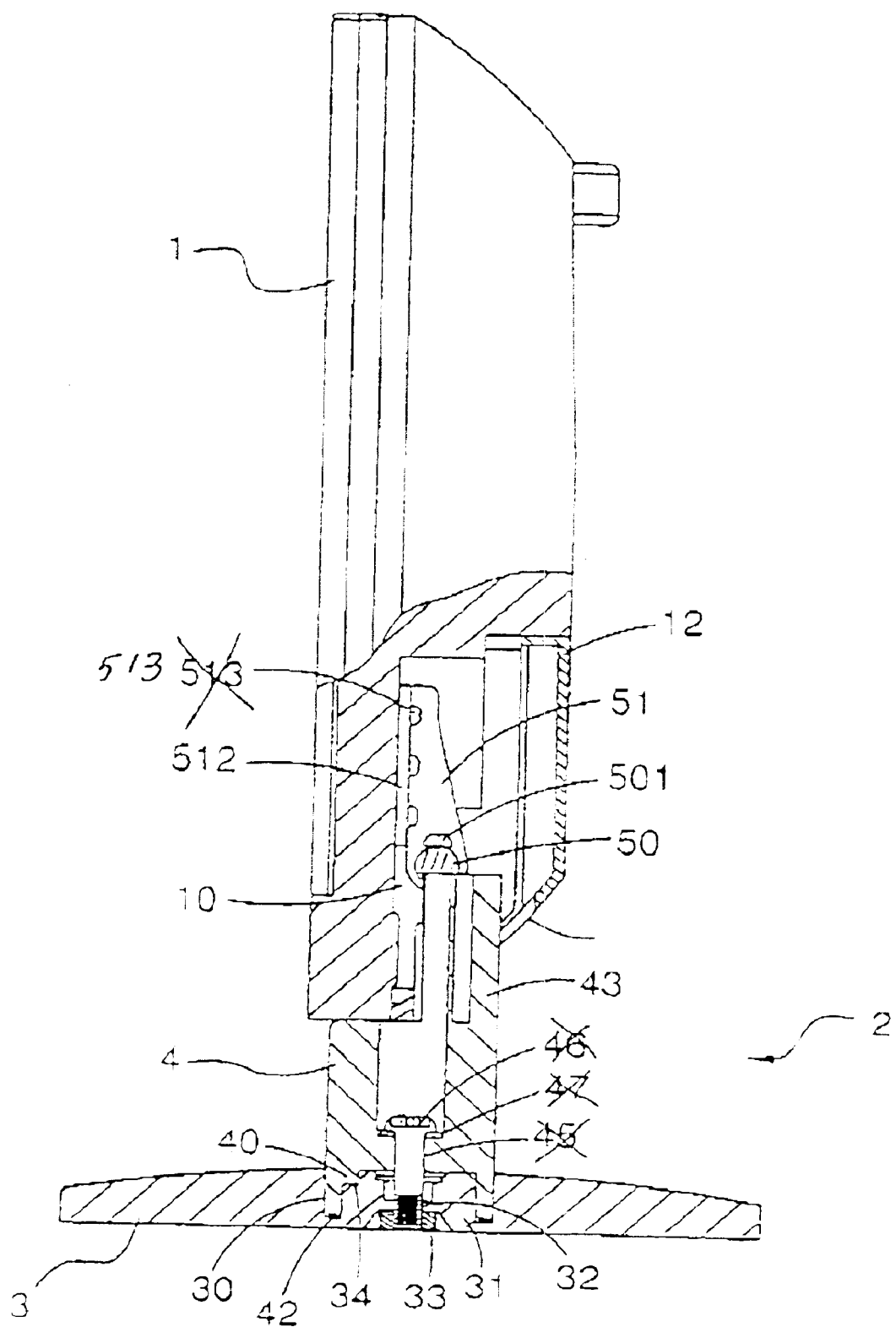
FIG. 4 is a sectional view of the present invention.

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1 to 4, there is shown a display structure for supporting display 1 so as to adjust the rotation of the display 1 and the angle of the display.

In accordance with the present invention, the display 1 includes a recess 10 at the rear side thereof and the recess 10 is provided with a plurality of screw holes 11 for the mounting of the adjustment device 5 onto the securing seat 510 with screws 513, and the top of the recess 10 is covered with a rear cover 12, and the bottom section of the rear cover 12 is provided with a plurality of notches 13 for a support rod 4, and for the passages of connection wires or power source wires of the display 1.

The bottom seat 2 includes a seat body 3 which has a center top face being provided with an engaging slot 30. The engaging slot 30 is provided with a protruded pillar 31. A through hole 32 is provided on the protruded pillar 31, passing through to the bottom section of the seat body 3. The bottom section of the seat body 3 is provided with a screw nut 33. The front end edge of the protruded pillar 31 is provided with an appropriate length arch-shape positioning slot 34.

A supporting rod 4 is pivotally mounted at the engaging slot 30 at the bottom section thereof. The inner side wall of the bottom section is provided with a position in rib 40 extended to the positioning slot 34. The bottom end of the support rod 4 is a rim slot 41 mounted with a wear-resistance pad 42. The support rod 4 is provided with a securing section 43 having a plurality of securing screw holes 44, and the center bottom face of the securing rod 50 is provided with a securing flat face 500 for urging onto the securing section 43, and by means of two securing screws 501 the securing flat face 500 is screwed onto the securing hole of the securing section 43.

The elevation adjusting device 5 includes a securing rod 50, with two ends mounted with a hinge chain module 51; a seat body 3 including an engaging slot 30 and a positioning slot 34; a support rod 4 including a positioning rib 40 thereby one side of the display 1 is connected to the chain module 51 of the adjustment device 5, the securing rod 50 being connected to one end of the support rod 4, the support rod 4 corresponding to the other end of the adjustment device 5 is connected to the engaging slot 30, the positioning rib 40 is extended to the positioning slot 34 of the seat body 3 so that the LCD can be adjusted.

The hinge chain module 51 includes a securing seat 510 mounted with positioning holes 511 for the positioning shaft 502, the ends of the positioning holes 511 are extended outward to form a fan-like shape, the securing seat 510 is disposed with a securing plate 512 which can be mounted on the display 1, the two lateral sides of the seat 510 are mounted with two damping pads 514 and the external side of the damping pads 514 is provided with an elastic pad 515 and at least a pressing pad 516 mounted by way of a screw nut 517 to the end of the positioning shaft 502. The screw nut 517 at the end section of the positioning shaft 502 allows the tightness of the hinge chain modules 51.

Figure 5:
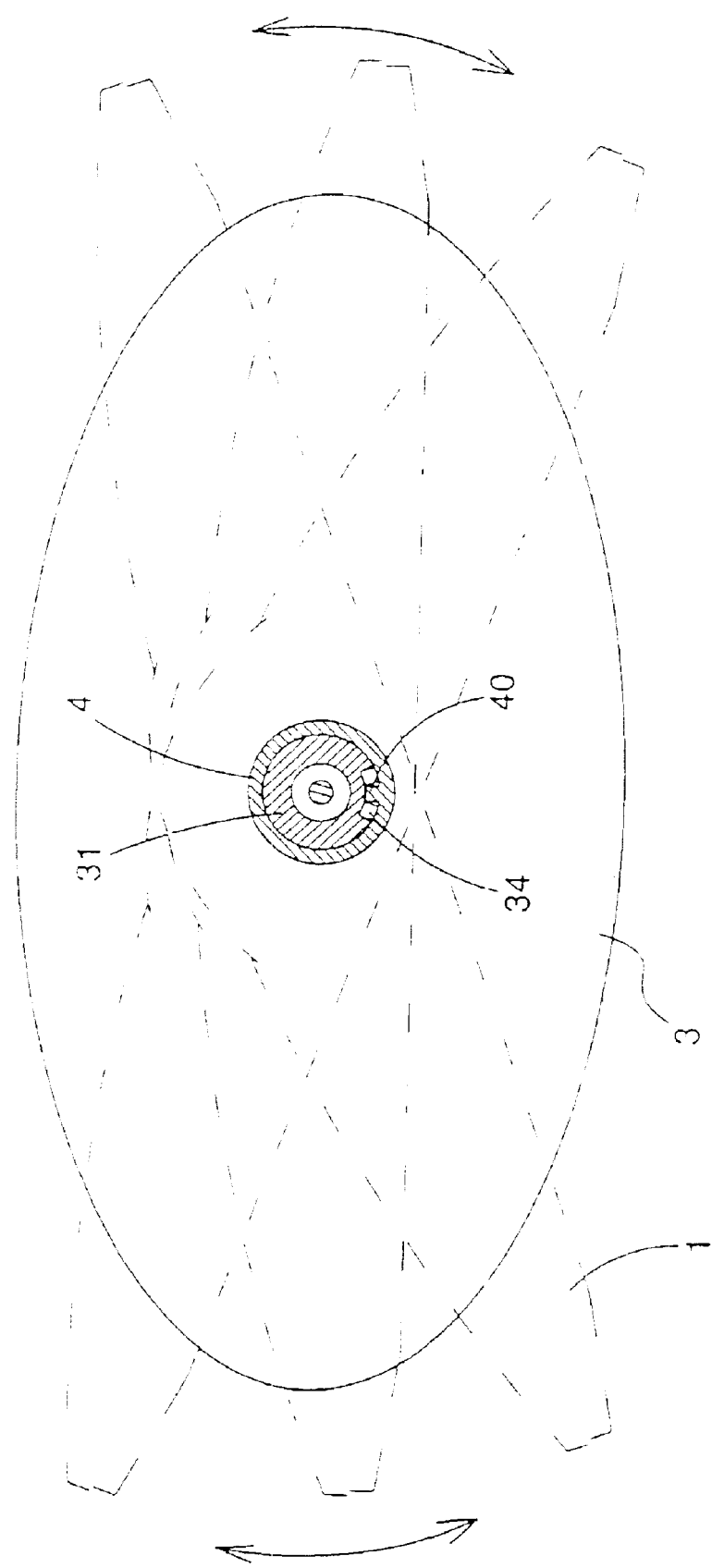
FIG. 5 is a schematic view showing the rotational motion of the present invention.

Referring to FIG 5, the support rod 4 pivotally mounted at the engaging slot 30 of the seat body 3 allows the display 1 to rotate on the bottom seat 2. In the course of rotation, the positioning rib 40 urged by the positioning slot 34 restricts the display to rotate only at an appropriate angle.

Figure 6:
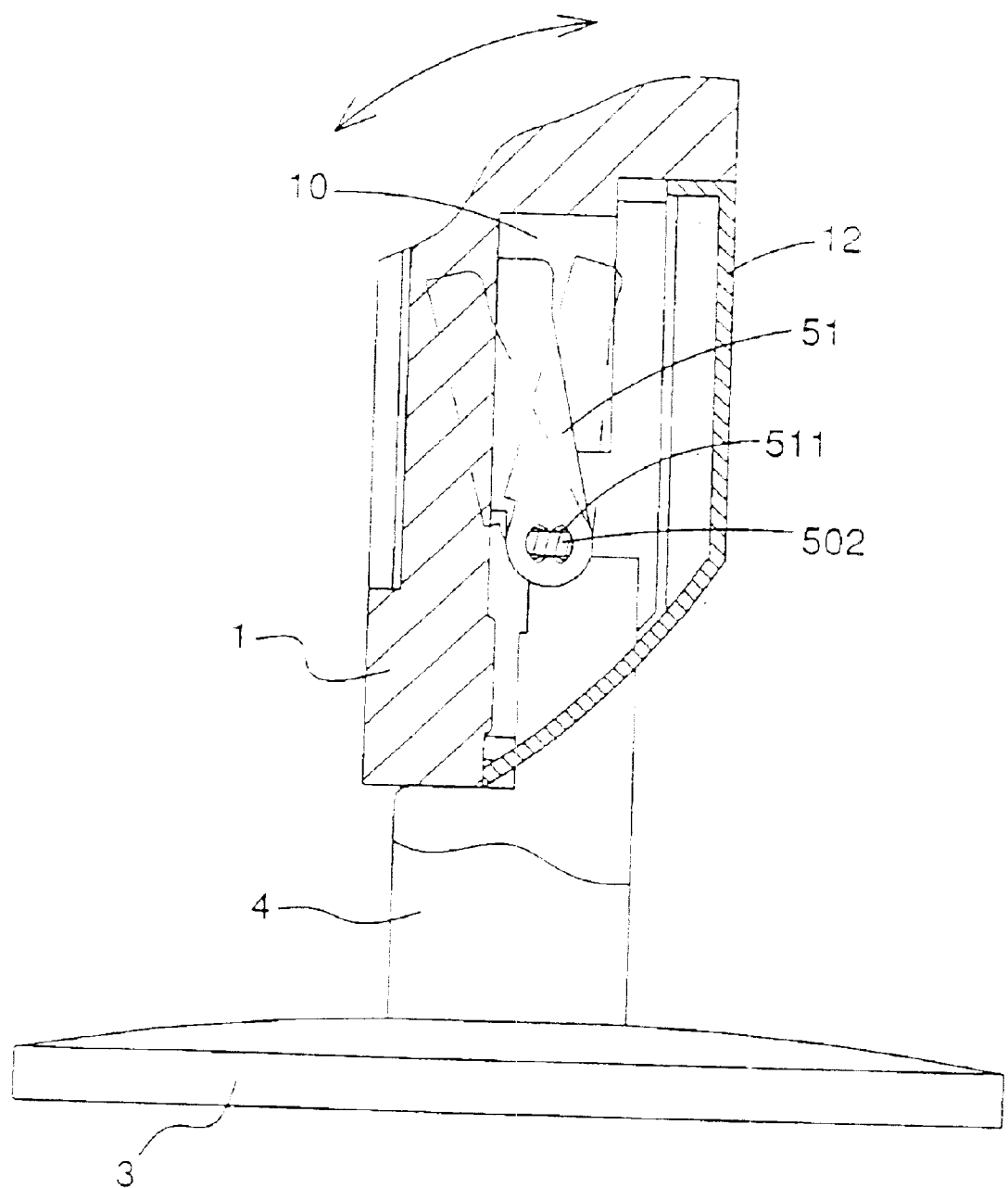
FIG. 6 is a schematic view showing the elevational motion of the present invention.

As shown in FIG. 6, the positioning hole 511 being an outward extended fan-like shape together with the elongated positioning shaft 502 restricts the swinging angle of the display 1. Accordingly, an appropriate angle of the display 1 is obtained.

In accordance with the present invention, the pivotal mounting of a support rod 4 onto the engaging slot 30 of the seat body 3 and the mounting of an adjustment device 5 on the support rod 4 to the display allows the display 1 to rotate and allows the angle to be adjusted. Using the support rod 4 and the positioning rib 40 on the seat body 2 together with the combination of the positioning slot 34, the fan-like shape extended end of the positioning hole 511 at the ends thereof, the angle of rotation is controlled.

In accordance with the present invention, the structure of the LCD is simple and lesser components are required.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. A liquid crystal display (LCD) structure comprising:
   a display;
   an adjustment device having a securing rod with two ends mounted with a hinge chain module;
   a seat body including an engaging slot and a positioning slot;
   a support rod including a positioning rib;
   whereby one side of the display is connected to the chain module of the adjustment device, the securing rod being connected to one end of the support rod, a second end of the support rod is connected to the engaging slot, the positioning rib is extended to the positioning slot of the seat body so that the LCD can be adjusted;
   wherein the display includes a recess at a rear side thereof and the recess is provided with a plurality of screw holes for mounting of the adjustment device onto a securing seat with screws, and the recess is covered with a rear cover, and a bottom section of the rear cover is provided with a plurality of notches for the support rod, and for passages of connection wires or power source wires of the display.

2. The liquid crystal display structure of claim 1, wherein a protruded pillar of the engaging slot of the seat body is provided with a through hole to a bottom section of the seat body, and the bottom section of the seat body is mounted with a screw nut, and the support rod is provided with a passing hole to the bottom section, the passing hole is for mounting of a pivot shaft screw with a pad onto the screw nut of the seat body.

3. The liquid crystal display structure of claim 1, wherein a top section of the support rod is provided with a securing section having a plurality of securing screw holes, and a center bottom face of the securing rod is provided with a securing flat face for urging onto the securing section, and by means of two securing screws the securing flat face is screwed onto the securing hole of the securing section.

4. The liquid crystal display structure of claim 1, wherein the engaging slot of the body is provided with a protruded pillar having one edge provided with the positioning slot.

* * * * *